(12) United States Patent (10) Patent No.: US 9,990,057 B2
Kim (45) Date of Patent: Jun. 5, 2018

(54) MOUSE FOR COMPUTER

(71) Applicant: Tae Soo Kim, Busan (KR)

(72) Inventor: Tae Soo Kim, Busan (KR)

( * ) Notice: Subject to any disclaimer, the term of this patent is extended or adjusted under 35 U.S.C. 154(b) by 0 days. days.

(21) Appl. No.: 15/538,183

(22) PCT Filed: Dec. 29, 2015

(86) PCT No.: PCT/KR2015/014347
§ 371 (c)(1),
(2) Date: Jun. 20, 2017

(87) PCT Pub. No.: WO2016/114512
PCT Pub. Date: Jul. 21, 2016

(65) Prior Publication Data
US 2017/0344135 A1 Nov. 30, 2017

(30) Foreign Application Priority Data

Jan. 12, 2015 (KR) ........................ 10-2015-0004300
Oct. 1, 2015 (KR) ........................ 10-2015-0138764

(51) Int. Cl.
*G06F 3/03* (2006.01)
*G06F 3/0354* (2013.01)

(52) U.S. Cl.
CPC ........ *G06F 3/03543* (2013.01); *G06F 3/0304* (2013.01)

(58) Field of Classification Search
None
See application file for complete search history.

(56) References Cited

U.S. PATENT DOCUMENTS 5,260,696 A * 11/1993 Maynard, Jr. ....... G06F 3/03543
345/157
2006/0181512 A1* 8/2006 Wang .................. G06F 3/03543
345/163

(Continued)

FOREIGN PATENT DOCUMENTS

JP 05-079640 U 10/1993
JP 3062272 U 9/1999

(Continued)

OTHER PUBLICATIONS

KR Notification of Reason for Refusal dated Nov. 20, 2015 as received in Application No. 10-2015-0138764 (English Translation).

(Continued)

*Primary Examiner* — Joseph Haley
(74) *Attorney, Agent, or Firm* — Maschoff Brennan

(57) ABSTRACT

The present invention relates to a mouse for a computer, which is a computer input device. The mouse has an upper case with a vertical cushioning function against force imposed on the mouse, and thus can operate smoothly. The present invention provides a cushioning function to a mouse, thereby eliminating fatigue and muscle pain of the wrist and fingers even when a user uses the mouse for a long time. The mouse is manufactured by assembling an upper case and a lower case, and is configured such that a protrusion box which protrudes upwards is formed on the lower case, a boss is fixed on the lower side of the upper case and penetrates the protrusion box, thereby being joined with the same, and a spring which is supported by the protrusion box is inserted into the boss from the outside while the lower side of the boss can be prevented from being separated from the protrusion box.

4 Claims, 6 Drawing Sheets

(56) References Cited

U.S. PATENT DOCUMENTS

| | | | | |
|---|---|---|---|---|
| 2013/0141333 A1* | 6/2013 | Chen | ............... | G06F 3/03543 |
| | | | | 345/163 |
| 2015/0022451 A1* | 1/2015 | Drougge | ............ | G06F 3/03543 |
| | | | | 345/163 |

FOREIGN PATENT DOCUMENTS

| JP | 2003-150307 A | 5/2003 |
|---|---|---|
| JP | 2010-262619 A | 11/2010 |
| KR | 20-0346221 Y1 | 3/2004 |
| KR | 20-0346222 Y1 | 3/2004 |
| KR | 10-2009-0020839 A | 2/2009 |
| KR | 20-0453605 Y1 | 5/2011 |
| KR | 20-2015-0002244 U | 6/2015 |

OTHER PUBLICATIONS

KR Grant of Patent dated Dec. 2, 2015 as received in Application No. 10-2015-0138764 (English Translation).

* cited by examiner

MOUSE FOR COMPUTER

TECHNICAL FIELD

The present invention relates to a computer mouse as a computer input device, and more particularly, to a mouse having a cushioning function that moves up and down when force is applied thereto. Use of the mouse according to the present invention may reduce wrist fatigue and shoulder pain caused when using a mouse.

BACKGROUND ART

Computers, wherein a mouse is used as a computer input device, are almost indispensable in modern society. However, since a mouse does not have a height adjustment function according to gripping force, users who use a mouse for a long time, such as office workers, professional gamers, and CAD workers, frequently experience wrist and finger fatigue.

In general, a computer mouse is moved forward, back, left, and right while being held in a user's hand, a scroll wheel capable of rotating forward and backward may formed at the front upper portion of the mouse, and click buttons may be provided on the left and right sides of the scroll wheel. In addition, buttons may be installed on the side surfaces of the mouse.

When using a mouse, the user's forearm touches a table and the wrist hovers above the table. At this time, since the mouse is manipulated in a state of being wrapped around the user's palm, excessive force may be applied to the wrist. As a result, when the user continues to use the mouse for a long time, the user may experience wrist fatigue and shoulder muscle pain.

That is, when a user uses a mouse for a long time while holding the mouse, weak but constant force is applied to the wrist, arm and shoulder. As a result, muscle stiffness and fatigue may be induced and, in severe cases, muscle ache may be caused.

To solve these problems, new types of computer mice are disclosed. For examples, Korean Utility Model Registration No. 20-0346221 discloses a mouse in which the upper case is resiliently moved up and down by a spring when the mouse is held and force is applied thereto. Korean Utility Model Registration No. 20-0346222 discloses a mouse having a protruding contact portion protruded by a spring when the mouse is held. In Korean Utility Model Registration No. 20-453605, a mouse with an elastomeric body is disclosed. According to Korean Utility Model Registration No. 20-453605, when force is applied to the mouse, the mouse is concavely deformed, and when the force is released, the mouse returns to the original state thereof. However, it is not easy to provide proper elasticity depending on the degree of force applied to the mouse, and the mouse is structurally difficult to manufacture. In particular, the mouse cannot provide flexible elastic force due to force applied to the wrist, so that smooth operation is difficult.

PRIOR ART DOCUMENTS

Patent Documents (Patent Document 1) Korean Utility Model Registration No. 20-0346221 (Registered on Mar. 16, 2004)
(Patent Document 2) Korean Utility Model Registration No. 20-0346222 (Registered on Mar. 16, 2004)
(Patent Document 3) Korean Utility Model Registration No. 20-0453605 (Registered on May 6, 2011)
(Patent Document 4) Korea Utility Model Publication No. 20-2015-0002244 (Published on Jun. 15, 2015)

DISCLOSURE

Technical Problem

Therefore, the present invention has been made in view of the above problems, and it is one object of the present invention to provide a mouse in which the upper case of the mouse is moved up and down by the elastic force of a spring when gripping force is applied to the mouse. According to the mouse of the present invention, since the height of the mouse is flexibly adjusted by force applied to the mouse, the mouse is smoothly manipulated by force applied to the wrist. Therefore, when using the mouse of the present invention, wrist fatigue and shoulder pain may be alleviated.

The mouse of the present invention is structurally simple and easy to manufacture, and the lower case coupled to the upper case, which is gripped by the hand, is rotated while being coupled to the front of a body closely attached to the floor, and at the same time, the height of the mouse is adjusted. This movement is caused by the elasticity of a spring with the lower case coupled to the mouse body.

Technical Solution

In accordance with one aspect of the present invention, provided is a mouse having a cushioning function that reduces fatigue and muscle pain in the wrists and shoulder muscles even when used for a long period of time. The mouse of the present invention has the following structural features and is manufactured by the following manner. In a lower case in close contact with the floor, protrusion boxes protruding upward are formed, and, in an upper case, bosses are fixed to the lower side of the upper case. When the upper case and the lower case are assembled, the bosses are coupled through the protrusion boxes. At this time, springs supported by the protrusion boxes are inserted into the bosses, so that the lower sides of the bosses are not separated from the protrusion boxes. When force is applied to the upper case, the upper case bounces due to the springs. At this time, the upper case moves while being coupled to the lower case, whereby the load applied to the mouse is dispersed.

In addition, according to the configuration of the mouse of the present invention, the lower case is coupled to the lower side of the upper case where a scroll wheel is installed and exposed; a body is closely fitted to the bottom of the lower case to be engaged; the upper side of the body and the lower side of the upper case are coupled via the spring for providing elasticity; and the body inserted into the lower case protrudes downward and is coupled to the lower case so as not to be detached. When pressing force is applied to the mouse, the mouse moves up and down by the elastic force of the spring while the body is in close contact with the bottom.

In addition, according to the configuration of the mouse of the present invention, a scroll wheel protrudes upward from the front of the mouse, an optical sensor and a substrate are attached to the body, and an assembly wing protrudes from a side of the body; the body is fitted into the mouse so that the body is allowed to move up and down, and the lower case is engaged with the body to prevent the body from falling off; a coupling means is located inside the front portion to which the body and the lower case are connected, and rotatably connects the body and the lower case to each other; an inner case is coupled to the upper side of the lower case, and a click button and the upper case are attached to the upper side of the inner case while the scroll wheel protrudes therefrom; and the upper side of the body and the lower side of the inner case are coupled via the spring, and the spring provides elasticity to the inner case.

Advantageous Effects

The mouse according to the present invention is characterized in that the height of the mouse is flexibly changed by gripping force. Accordingly, since the load applied to the mouse is dispersed when the mouse is gripped, it is possible to prevent the occurrence of wrist fatigue, shoulder pain or muscle pain, even when a user uses the mouse for a long time.

According to the mouse of the present invention, the elastic force of a spring changes depending on force applied to the mouse when the mouse is gripped, thereby changing the height of the mouse. As a result, the impact applied to the wrist is absorbed. In addition, when force is applied to the mouse, only the upper case of the mouse rotates about the front of the mouse, thereby relieving the impact on the wrist. Therefore, it is possible to smoothly operate the mouse without imposing strain on the wrist.

BEST MODE FOR CARRYING OUT THE INVENTION

Figure 1:
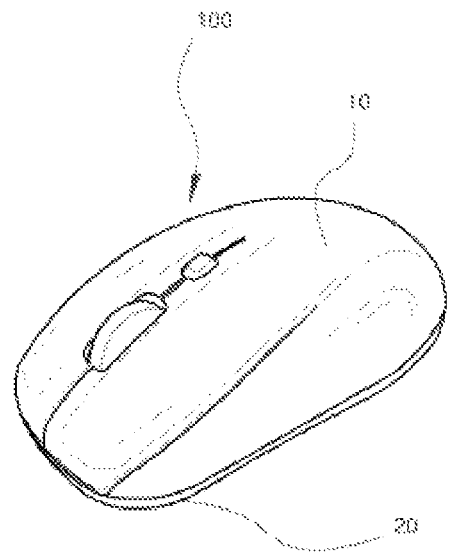
FIG. 1 is a perspective view of the mouse of the present invention.

The present invention relates to a wired or wireless mouse as a computer input device having a cushioning function of moving up and down by gripping force. When strong force is applied to the mouse, the height of the mouse is lowered. On the contrary, when weak force is applied to the mouse, the height of the mouse is increased. Since the height of the mouse is smoothly adjusted by the force of the hand pressing the mouse, wrist fatigue and shoulder pain may be reduced.

The mouse according to Example 1 is resiliently moved up and down by a spring. Accordingly, when a user inputs information using the mouse, the user may smoothly operate the mouse while reducing wrist fatigue and pain. The mouse is constructed by coupling the upper case and the lower case, wherein the upper case and the lower case are connected to each other through a spring to have elasticity. Thus, the height of the upper case is automatically adjusted by gripping force.

According to the mouse of the present invention, a protrusion box protruding inward of the lower case which is in close contact with a floor is formed; a boss is formed at the lower side of the upper case and the boss is fitted in the protrusion box so as not to fall out; and a spring is inserted into the boss at the upper portion of the protrusion box. With this structural feature, when the upper case is lowered, the spring is pressed, storing elastic energy.

According to the mouse of Example 2, a body is fitted to the lower case and the body is moved up and down while being coupled to the lower case. At this time, the body is configured not to fall to the lower side of the lower case. In addition, a spring is installed between the body and the upper case to provide elasticity to the mouse. Therefore, when no force is applied to the mouse, the lower case is moved upward so that the body touching the floor is exposed. Conversely, when force is applied to the mouse, the spring is pressed and the lower case is moved to cover the body. This feature may reduce wrist fatigue and pain when using the mouse.

According to the mouse of Example 3, an inner case is coupled to the upper side of a lower case while a click button and an upper case are placed on the upper side of the inner case. A scroll wheel is attached to the lower case of the mouse, and a body to which an optical sensor and a substrate are attached is inserted into the lower case. At this time, the body is configured not to fall to the lower side of the lower case. A spring is installed between the upper side of the body and the inner case to provide elastic force. A coupling means is provided on the front of the body and inside the front of the lower case, and the coupling means is rotatably installed while coupling the body and the lower case. When gripping force is applied to the mouse, the upper case and the lower case are resiliently moved up and down by the spring while the body is in close contact with the floor. At this time, the front of the body and the front of the lower case is rotatably coupled in the form of a hinge.

According to the mouse of Example 1, when force is applied to an upper case spaced apart from the upper portion of a lower case in a state in which the lower case is in close contact with the floor, a spring is pressed and the upper case moves up and down. At this time, the whole upper case moves up and down regardless of the front and rear directions.

According to the mouse of Example 2, when a load is applied to an upper case in a state in which a body protrudes from the lower side of a lower case and is in close contact with the floor, the lower case coupled with the upper case moves downward while compressing a spring. At this time, the upper case and the lower case move up and down together.

According to the mouse of Example 3, a body is formed to protrude from the lower side of a lower case, and an inner case is covered and fixed to the upper side of the lower case and then a click button and the upper case are covered and fixed. A spring is installed between the body and the inner case. When force is applied to the upper case, the spring is compressed, storing elastic energy. In addition, the body and the lower case are coupled to each other in the form of a hinge at the front by a coupling means, and with respect to the coupling means, a hinge-bending motion occurs between the body closely attached to the floor and the upper case.

At this time, the inner case is placed on the upper portion of the lower case and fixed thereto, and a click button and an upper case are placed on the upper side of the inner case and a scroll wheel is engaged in an exposed state.

MODE FOR CARRYING OUT THE INVENTION

The present invention is described in detail below with reference to the accompanying examples and drawings.

Figure 2:
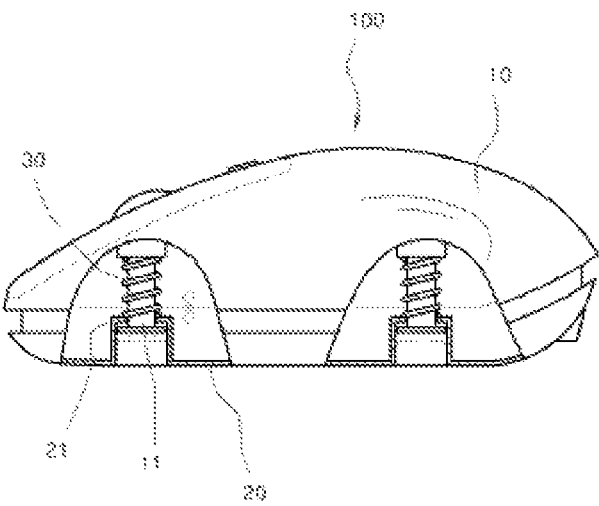
FIG. 2 is a cross-sectional view illustrating important parts of the mouse according to Example 1.

As illustrated in FIGS. 1 and 2 corresponding to Example 1, when gripping force is applied to an upper case of a mouse 100, a spring 30 is pressed to provide elasticity to the upper case 10. A boss 11 protrudes from the lower side of the upper case 10 while a protrusion box 21 is formed so as to protrude upward from the inside of a lower case 20 which is in close contact with the floor, and the boss 11 is inserted into the protrusion box 21. The boss 11 is moved up and down in a state of being fitted in the protrusion box 21. At the upper portion of the protrusion box 21, the spring 30 inserted into the boss 11. At this time, when the upper case 10 is pressed, the boss 11 is lowered and the spring 30 is pressed.

Force acting on the upper case 10 depends on the force of the hand holding the mouse 100, and thus the degree to which the spring 30 is pressed is changed. As a result, the mouse 100 moves up and down according to the force of the hand holding the mouse 100. Therefore, when the mouse 100 is used, wrist fatigue and shoulder pain may be reduced.

According to Example 1, the mouse 100 is constructed by coupling the upper case 10 to the upper side of the lower case 20 closely contacting with the floor. A boss 11 protruding from the lower side of the upper case 10 is inserted into the protrusion box 21 protruding upward of the lower case 20, and the spring 30 is inserted into the boss 11 at the upper portion of the protrusion box 21. When the upper case 10 is moved downward, the spring 30 is pressed and moved to the lower portion. On the other hand, when the force applied to the upper case 10 is weakened, the upper case 10 is moved upward by the elastic force of the spring 30. Therefore, when using the mouse, wrist fatigue and pain may be reduced.

Figure 3:
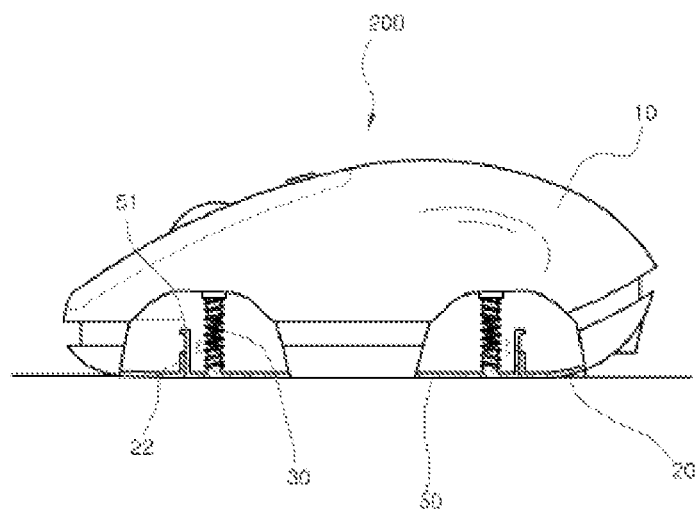
FIG. 3 is a cross-sectional view illustrating important parts of the mouse according to Example 2.
Figure 4:
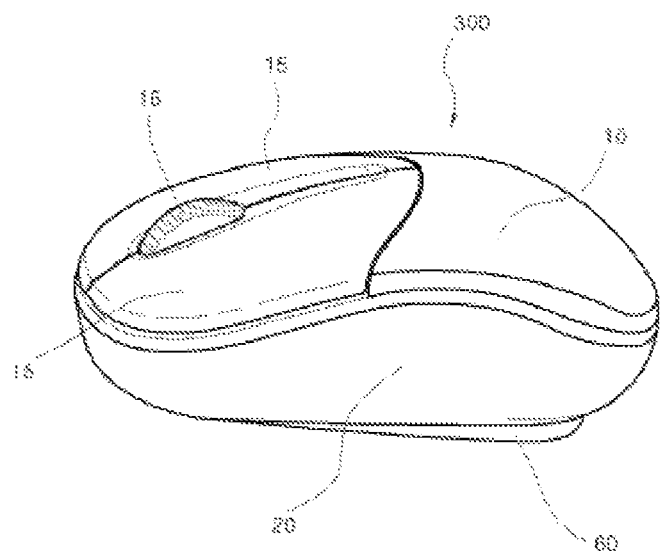
FIG. 4 is a perspective view of the mouse according to Example 3.
Figure 5:
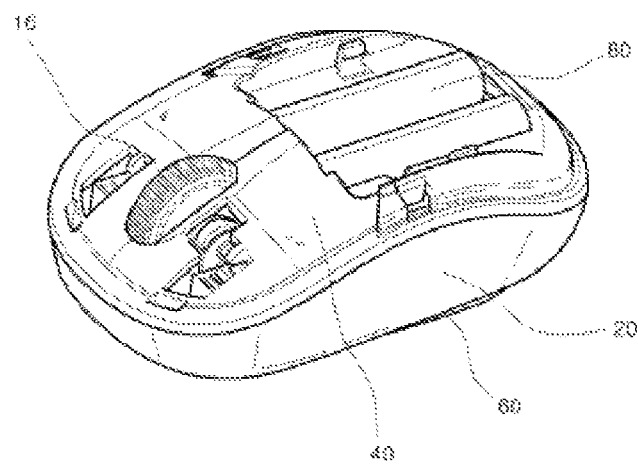
FIG. 5 is a perspective view of the mouse according to Example 3, showing a state in which the upper case is removed.
Figure 6:
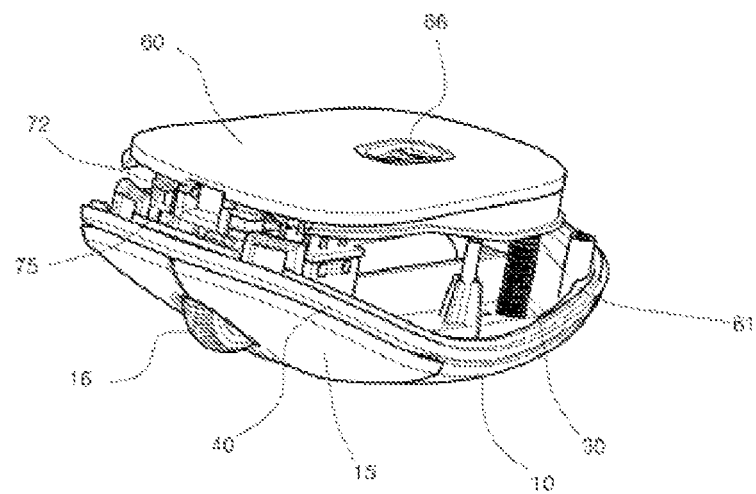
FIG. 6 is a perspective view of the lower side of the mouse according to Example 3, showing a state in which the lower case is removed.
Figure 7:
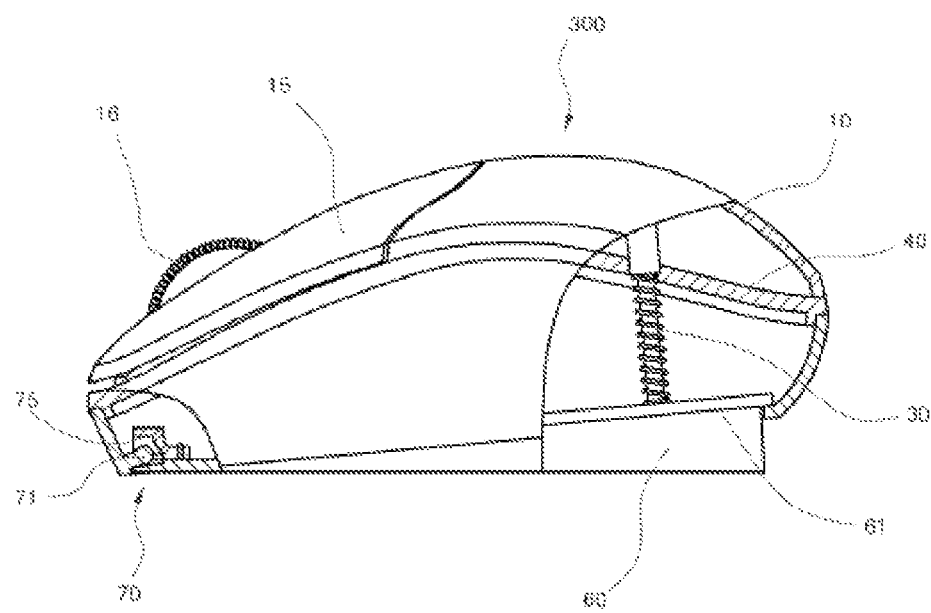
FIG. 7 is a cross-sectional view illustrating important parts of the mouse according to Example 3.
Figure 8:
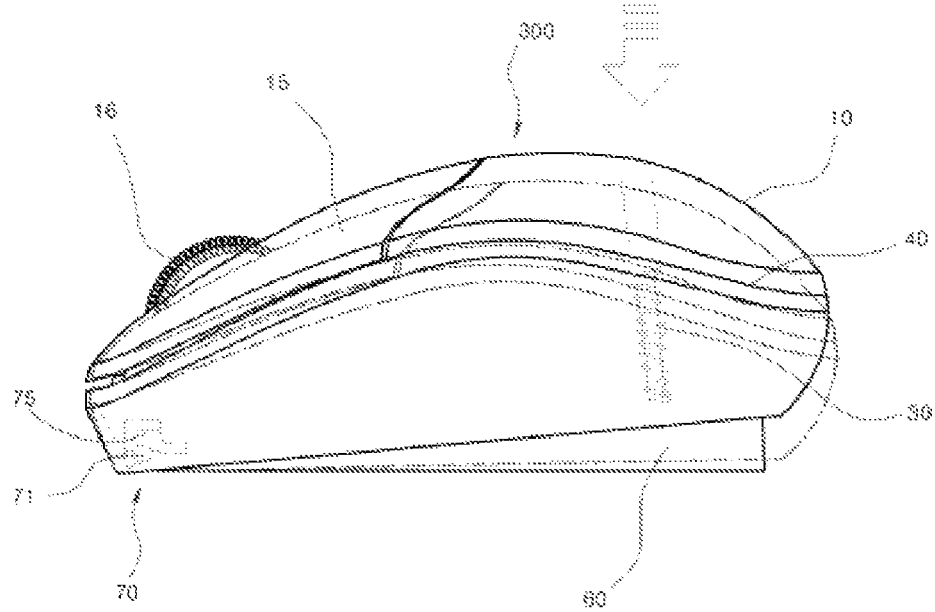
FIG. 8 is a side view illustrating the operation of the mouse according to Example 3.
Figure 9:
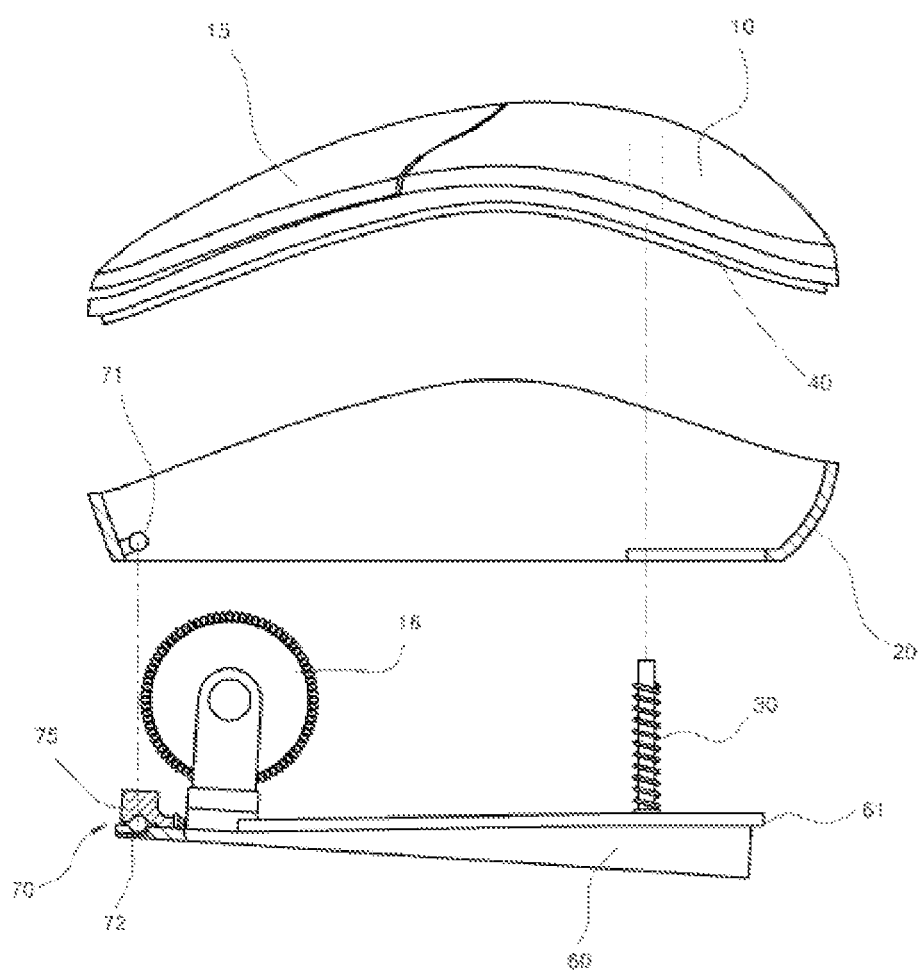
FIG. 9 is a side view illustrating important parts of the mouse according to Example 3, showing the disassembled state.
Figure 10:
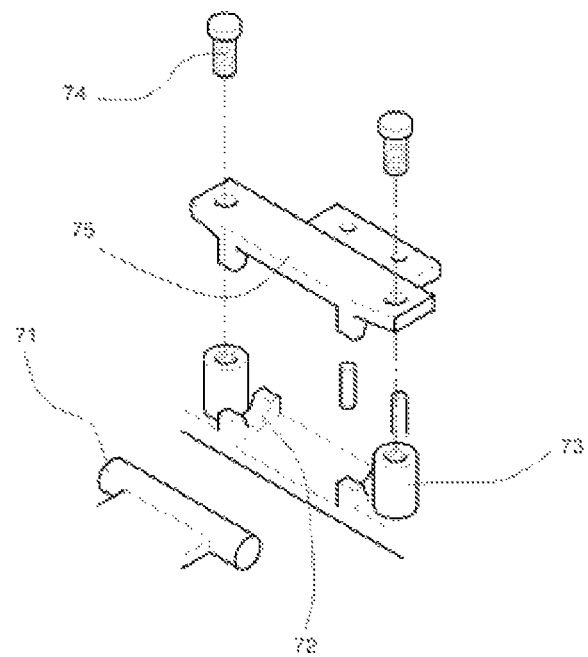
FIG. 10 is a perspective view illustrating the coupling means of the mouse according to Example 3.
Figure 11:
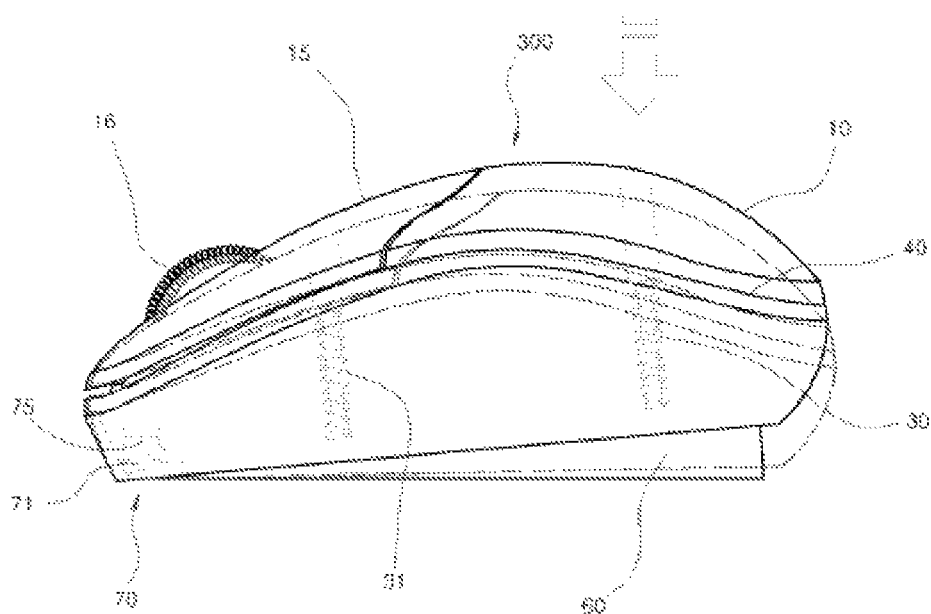
FIG. 11 is a cross-sectional view illustrating important parts of the mouse according to another example based on Example 3.

As illustrated in FIG. 3 corresponding to Example 2, unlike Example 1, a mouse 200 is constructed by coupling the upper case 10 to the upper side of the lower case 20 and a body 50 is coupled to the lower case 20, and a locking protrusion 51 is formed on the outer side of the body 50 and a locking projection 22 is formed on the lower case 20. The locking protrusion 51 of the body 50 is configured to be supported by the locking projection 22 of the lower case 20 so that the body 50 remains in the coupled state without falling into the lower side of the lower case 20. In addition, the locking protrusion 51 is formed at a position having a constant height. This structural feature keeps the lower case 20 at a constant height while the body 50 is in close contact with the floor.

According to the mouse of Example 2, the spring 30 is installed between the body 50 and the upper case 10, and the upper case 10 is resiliently supported by the spring 30 at the upper side of the body 50. The upper case 10 and the lower case 20 are held in a fixed state, and the spring 30 is pressed by force applied to the upper case 10 so that the upper case 10 is pushed downward.

Therefore, according to Example 2, when the mouse 200 constructed by coupling the upper case 10 and the lower case 20 is pressed downward, the spring 30 is pressed down.

When the force to press the mouse 200 becomes weak, the mouse 200 moves upward by the elastic force of the spring 30. As a result, movement of the mouse 200 is controlled depending on the force applied to the mouse 200 while the mouse 200 is resiliently supported by the spring 30. Thus, wrist fatigue and pain may be reduced.

As illustrated in FIGS. 4 to 11 corresponding to Example 3, an inner case 40 is inserted into and fixed to the upper side of the lower case 20; a click button 15 and the upper case 10 are coupled and fixed to the upper side of the inner case 40 while a body 60 is coupled to the lower side of the lower case 20 in a state wherein a body 60 protrudes; and the spring 30 is installed between the upper side of the body 60 and the lower side of the inner case 40. When the upper case 10 is lowered, the spring 30 is compressed, storing elastic energy. The front of the body 60 and the front of the lower case 20 are coupled in the form of a hinge through a coupling means 70. When a load is applied to the upper case 10 in a state in which the body 60 is in close contact with the floor, the spring 30 is pressed and, about the coupling means 70, a hinge-bending motion occurs between the body 60 closely attached to the floor and the lower case 20.

According to the mouse of the present invention, an assembly wing 61 protruding upward on the outer side of the body 60 coupled to the lower case 20 is formed, and the body 60 is inserted into a hole formed in the inner side of the lower case 20. At this time, most of the body 60 is exposed to the outside from the lower portion of the lower case 20, but the body 60 is not released to the lower side of the lower case 20 because the assembly wing 61 is supported by the bottom of the lower case 20.

In addition, the body 60 is formed to increase in height from the front to the rear. Thus, the lower case 20 may be moved up and down about the coupling means 70 provided at the front of the body 60.

According to the computer mouse of the present invention, in the coupling means 70 for coupling the lower case 20 in the hinge form at the front of the body 60, a joining groove 72 is formed in which a rod-shaped rotating shaft 71 is inserted, and a fixed boss 73 into which a setscrew 74 is inserted is formed on the side surface of the joining groove 72; the rotating shaft 71 projecting inward is formed in the front of the lower case 20, and a coupling cover 75 is placed on the upper side of the joining groove 72 in a state in which the rotating shaft 71 is supported by the joining groove 72; and the setscrew 74 is inserted into the fixed boss 73 through the coupling cover 75, whereby the rotating shaft 71 is rotatable in the coupled state.

In addition, a joining groove is formed in the coupling cover 75 to cover the rotating shaft 71 in a semicircular shape. Thus, the rotating shaft 71 is rotated while being fitted in the joining groove 72 and the coupling cover 75.

According to the mouse of the present invention, a scroll wheel 16, an optical sensor 66 and a known substrate are installed on the upper side of the body 60; the inner case 40 is inserted into and fixed to the upper side of the lower case 20; the click button 15 is installed on the upper side of the inner case 40 and the inner case 40 is covered with the upper case 10; and a portion of the scroll wheel 16 protrudes above the click button 15.

According to Example 3, when the click button 15 is pressed, force applied to the click button 15 is detected by a known sensing element installed at the lower part of the inner case 40. When the upper case 10 is peeled off, a battery 80 for power supply installed inside the inner case 40 is shown. Such a method of installing the sensing element and the battery 80 is known in the art. The present invention is applicable to wired and wireless mice, and in the case of a wireless mouse, a remote transmitting/receiving device is additionally provided.

According to Example 3, the spring 30, an elastic means, is installed between the inner case 40 and the body to provide elasticity. When the upper case 10 is pressed between the inner case 40 and the body 60, the spring 30 is compressed, storing elastic energy. The spring 30 is configured so that the spring 30 can be inserted into a separated, extruded boss, and the spring 30 is fitted between the inner case 40 and the body 60. Thus, when the spring 30 is pressed, elasticity is provided.

According to Example 3, the spring 30 responsible for providing elastic force is installed on both sides of the lower side of the upper case 10 viewed from the side surface of a mouse 300, but if necessary, the spring 31 may be installed on the lower side of the click button 15. In addition, when the mouse 300 is used, only the spring installed in one direction may be used, and in some case, both of the springs 30 and 31 installed on both sides may be used.

According to Example 3, the upper case 10 is vertically rotated about the coupling means 70 installed at the front of the body 60 closely attached to the floor. The mouse 300 ensures smooth operation while ensuring reliable operation with small force, and thus the mouse 300 may be used for a long time without experiencing wrist fatigue and shoulder pain.

As illustrated in the drawing of Example 1, when gripping force is applied to the upper case 10 of the mouse 100, the upper case 10 is lowered and the spring 30 is compressed, storing elastic energy. Since the mouse 100 moves up and down depending on the force of gripping the mouse 100, the mouse 100 may be smoothly manipulated without difficulty, thereby reducing wrist fatigue and shoulder pain.

According to Example 1, when the mouse 100 is gripped, the boss 11 presses the spring 30 against the lower side of the upper case 10, and is inserted into the protrusion box 21 protruding upward from the bottom of the lower case 20. Thus, the upper case 10 is resiliently supported by the spring 30. The degree to which the upper case 10 is pressed varies depending on a force to hold the mouse 100, and thus the degree to which the spring 30 is compressed is changed. Therefore, the mouse 100 may gently move up and down depending on the force to grip the mouse 100, thereby reducing wrist fatigue and shoulder pain.

As illustrated in the drawing of Example 2, the mouse 200 is constructed by coupling the upper case 10 to the upper side of the lower case 20, and the body 50 is coupled to the bottom of the lower case 20. The spring 30 is installed between the body 50 and the upper case 10. With the body 50 touching the floor and the lower case 20 spaced apart from the floor, when the upper case 10 is gripped by hand, the mouse 200 presses the spring 30 depending on the gripping force, thereby generating elasticity. When the force to grip the mouse 200 is weakened, the body 50 is exposed by the restoring force of the spring 30 and the mouse 200 moves upward.

According to Example 2, when the mouse 200 is gripped, the mouse 200 including the upper case 10 coupled to the lower case 20 is pressed downward, compressing the spring 30. On the other hand, when the force to press the mouse 200 becomes weak, the mouse 200 moves upward by the elastic force of the spring 30. Thus, since the height of the mouse 200 is lowered by the force applied to the mouse 200, wrist fatigue and pain may be reduced even when the mouse 200 is used for a long time.

As illustrated in the drawing of Example 3, the lower side of the body 60 is kept in close contact with the floor, and when the mouse 300 is not gripped, the lower side of the assembly wing 61 of the body 60 is exposed from the side surface. At this time, since the height of the body 60 increases toward the rear, the front of the body 60 is hardly exposed, but the rear of the body 60 is significantly exposed.

In this state, the spring 30 is not pressed. When the mouse 300 is gripped at this time, the upper case 10 is pressed downward by the force of gripping the mouse 300. As a result, the spring 30 is pressed and the lower case is moved downward, and the lower case 20 is lowered with the body 60 being coupled thereto.

At this time, the body 60 is in close contact with the floor, and in the front of the body 60, the rotating shaft 71 formed in the inner case 40 is coupled to the joining groove 72 and the coupling cover 75. Thus, with respect to the rotating shaft 71, the inner case 40 to which the upper case 10 is coupled rotates with the lower case 20 coupled to the upper side and moves downward.

That is, the upper case 10 is lowered about the rotating shaft 71 depending on the force to grip the mouse 300, thereby pressing the spring 30. On the other hand, when the force to grip the mouse 300 is reduced, the upper case 10 is moved upward by the elastic force of the spring 30.

According to the present invention, the assembly wing 61 protrudes upward on the outer side of the body 60 coupled to the lower case 20. When the body 60 is fitted to protrude from the inner side of the lower case 20 to the lower side, the assembly wing 61 is configured to be supported by the bottom of the lower case 20. Thus, most of the body 60 is exposed, but the upper side of the assembly wing 61 is not exposed. In addition, the body 60 does not fall from the lower case 20.

According to the present invention, the scroll wheel 16, the optical sensor 66 and a known substrate are installed on the upper side of the body 60, and the inner case 40 is inserted into and fixed to the upper side of the lower case 20; the click button 15 and the upper case 10 are placed on the upper side of the inner case 40; and a portion of the scroll wheel 16 protrudes above the click button 15.

According to Example 3, the spring 30 responsible for providing elastic force is installed on both sides of the lower side of the upper case 10 viewed from the side surface of the mouse 300, and the spring 31 may also be installed on the lower side of the click button 15. In addition, when the mouse 300 is used, only the spring 30 installed in one direction may be used, and both of the springs 30 and 31 installed on both sides may be used.

As described above, according to Example 3, the mouse 300 is vertically rotated about the coupling means 70 installed at the front of the body 60 closely attached to the floor. The mouse 300 ensures smooth operation while ensuring reliable operation with small force, and thus the mouse 300 may be used for a long time without experiencing wrist fatigue and shoulder pain.

The invention claimed is:
1. A computer mouse, wherein:
a scroll wheel protrudes from an upper portion of a mouse, an optical sensor and a substrate are attached to a body, and an assembly wing protrudes upward from a side of the body;
the body is fitted into the mouse so that the body is allowed to move up and down, and a lower case is supported by the assembly wing and engaged with the body to prevent the body from falling off;

a coupling means rotatably connects a front of the body and a front of the lower case to each other;

an inner case is coupled to an upper side of the lower case, and a click button and an upper case are attached to an upper side of the inner case while the scroll wheel protrudes therefrom; and an upper side of the body and a lower side of the inner case are coupled via a spring, and the spring provides elasticity to the inner case.

2. The computer mouse according to claim 1, wherein:

in the coupling means for connecting the front of the body and the front of the lower case in a hinge form, a joining groove, into which a rod-shaped rotating shaft is inserted, is formed, and a fixed boss into which a setscrew is inserted is formed on a side surface of the joining groove;

the rotating shaft projecting inward is formed in a front of the lower case;

a coupling cover is placed on an upper side of the joining groove in a state in which the rotating shaft is supported by the joining groove; and the setscrew is inserted into the fixed boss through the coupling cover, whereby the rotating shaft is coupled to the hinge.

3. The computer mouse according to claim 1, wherein the body inserted into the lower case while being supported by the lower case is formed to increase in height from a front to a rear, and in a case of the assembly wing formed on an outer side of an upper portion of the body, a rear portion is formed higher than a front portion.

4. The computer mouse according to claim 1, wherein the spring is installed between the inner case and the body at a lower side of the upper case, and a spring is installed between the inner case and the body at a lower side of the click button.

* * * * *